(12) United States Patent
Yuki (10) Patent No.: US 11,027,269 B2
(45) Date of Patent: Jun. 8, 2021

(54) PLUGGED HONEYCOMB STRUCTURE

(71) Applicant: NGK INSULATORS, LTD., Nagoya (JP)

(72) Inventor: Kazuya Yuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 443 days.

(21) Appl. No.: 15/907,618

(22) Filed: Feb. 28, 2018

(65) Prior Publication Data

US 2018/0272328 A1 Sep. 27, 2018

(30) Foreign Application Priority Data

Mar. 21, 2017 (JP) .............................. JP2017-054567

(51) Int. Cl.
  *B01D 46/24* (2006.01)
  *B01J 35/04* (2006.01)
  (Continued)

(52) U.S. Cl.
  CPC .......... *B01J 35/04* (2013.01); *B01D 46/0061* (2013.01); *B01D 46/2448* (2013.01);
  (Continued)

(58) Field of Classification Search
  None
  See application file for complete search history.

(56) References Cited

U.S. PATENT DOCUMENTS

| | | |
|---|---|---|
| 2005/0214503 A1 | 9/2005 | Sakamoto |
| 2007/0082174 A1 | 4/2007 | Masukawa et al. |

(Continued)

FOREIGN PATENT DOCUMENTS

| | | |
|---|---|---|
| JP | 2003-340224 A1 | 12/2003 |
| JP | 2013-203572 A | 10/2013 |

(Continued)

OTHER PUBLICATIONS

German Office Action (with English translation), German Application No. 10 2018 203 504.0, dated Apr. 28, 2020 (5 pages).

(Continued)

*Primary Examiner* — Humera N. Sheikh
*Assistant Examiner* — Mary I Omori
(74) *Attorney, Agent, or Firm* — Burr & Brown, PLLC (57) ABSTRACT

A plugged honeycomb structure, including: a plurality of honeycomb segments, a bonding layer and a circumferential wall disposed to surround circumference of a honeycomb segment bonded body where the plurality of honeycomb segments are bonded, wherein in the bonding layer, the bonding layer at a part that bonds the honeycomb segments disposed in contact with the circumferential wall is a circumferential bonding layer, and the bonding layer at a part that bonds the honeycomb segment including a center of gravity in a cross section orthogonal to the extending direction of cells of the honeycomb segment bonded body or at a position closest to the center of gravity and another honeycomb segment adjacent to the honeycomb segment is (Continued)

a center bonding layer, and a bonding strength A1 of the circumferential bonding layer is larger than a bonding strength A2 of the center bonding layer.

2 Claims, 3 Drawing Sheets (51) Int. Cl.
*B01D 46/00* (2006.01)
*C04B 38/00* (2006.01)
*C04B 41/00* (2006.01)
*C04B 41/85* (2006.01)
*B01J 37/02* (2006.01)
*C04B 41/50* (2006.01)
*B01D 53/94* (2006.01)

(52) U.S. Cl.
CPC ...... *B01D 46/2466* (2013.01); *B01J 37/0215* (2013.01); *C04B 38/0012* (2013.01); *C04B 41/009* (2013.01); *C04B 41/5089* (2013.01); *C04B 41/85* (2013.01); *B01D 53/944* (2013.01); *B01D 53/9418* (2013.01); *B01D 53/9454* (2013.01); *B01D 2046/2481* (2013.01); *B01D 2046/2496* (2013.01); *B01D 2255/9155* (2013.01); *B01D 2279/30* (2013.01)

(56) References Cited

U.S. PATENT DOCUMENTS

| | | | |
|---|---|---|---|
| 2008/0241501 A1* | 10/2008 | Ohno | C04B 28/24 428/305.5 |
| 2009/0011178 A1 | 1/2009 | Masukawa et al. | |
| 2009/0208700 A1* | 8/2009 | Ohno | B01D 46/2448 428/116 |
| 2010/0247854 A1* | 9/2010 | Takagi | B01D 46/2448 428/116 |
| 2013/0255212 A1 | 10/2013 | Takahashi et al. | |
| 2015/0275725 A1* | 10/2015 | Ichikawa | F01N 3/0222 428/116 |

FOREIGN PATENT DOCUMENTS

| | | |
|---|---|---|
| WO | 2005/089901 A1 | 9/2005 |
| WO | 2008/126333 A1 | 10/2008 |

OTHER PUBLICATIONS

Japanese Office Action (with English translation), Japanese Application No. 2017-054567, dated Dec. 1, 2020 (8 pages).

* cited by examiner

PLUGGED HONEYCOMB STRUCTURE

The present application is an application based on JP-2017-054567 filed on 21 Mar. 2017 with the Japan Patent Office, the entire contents of which are incorporated herein by reference.

BACKGROUND OF THE INVENTION

Field of the Invention

The present invention relates to plugged honeycomb structures. More specifically the present invention relates to a segmented-structured plugged honeycomb structure including a plurality of honeycomb segments bonded with a bonding layer and capable of effectively suppressing the generation of cracks at the surface of the circumferential wall along the bonding layer.

Description of the Related Art

Exhaust gas emitted from various types of internal combustion engines, such as a diesel engine, contains a lot of particulate matters, such as dust, soot and carbon particulates. For instance, a diesel particulate filter (DPF) is used as a device to purify exhaust gas emitted from an automobile including a diesel engine as the power source. Hereinafter the particulate matters may be called "PMs". A diesel particulate filter may be called a "DPF".

Such a DPF typically includes a plurality of cells as a through channel of fluid and these cells are defined by porous partition walls. Open ends of these plurality of cells are alternately plugged, so that the porous partition walls defining the cells serve as a filter.

Continuous removal of PMs in exhaust gas with the DPF causes the accumulation of the PMs in the DPF, and so the purifying efficiency of the DPF deteriorates and the pressure loss in the DPF increases. Such a purifying device including a DPF therefore has to have "regeneration processing", and in this processing, the accumulated PMs are burned with exhaust gas at high temperatures generated from the diesel engine.

Large thermal stress is applied to the DPF due to the heat to burn the PMs during the regeneration processing, and therefore countermeasure to avoid breakage of the DPF is necessary. Especially passenger vehicles have to have the regeneration processing frequently, and such countermeasure to avoid breakage of the DPF is especially important for these types of vehicles.

In one of the conventionally proposed techniques to avoid such breakage of the DPF, a DPF is manufactured by bonding a plurality of honeycomb-structured segments via a bonding material, instead of manufacturing a DPF including a single honeycomb structure (see Patent Document 1). Hereinafter a "honeycomb-structured segment" may be called a "honeycomb segment". A "honeycomb structure including a plurality of honeycomb segments bonded with a bonding layer" may be called a "segmented-structured honeycomb structure". Another honeycomb structure, which is compared with such a segmented-structured honeycomb structure, includes partition walls of the honeycomb structure that is an entirely continuous single structure. Such a "honeycomb structure including partition walls that is an entirely continuous single structure" may be called a "monolithic honeycomb structure". A "honeycomb structure having the open ends of the cells plugged with plugging portions" may be called a "plugged honeycomb structure".

[Patent Document 1] JP-A-2003-340224

SUMMARY OF THE INVENTION

A segmented-structured honeycomb structure can reduce thermal stress applied to the entire honeycomb structure, but has the drawback that cracks and the like easily occur at the bonding layer at the circumferential part of the honeycomb structure. For example, a honeycomb structure for DPF may be loaded with oxidation catalyst to promote oxidation and burning of PMs during the regeneration processing. To load the oxidation catalyst, the honeycomb structure is coated with slurry containing the oxidation catalyst, followed by a heat treatment at high temperatures for burning. During this heat treatment, cracks and the like may occur at the bonding layer at the circumferential part. When the temperature of exhaust gas rises or falls rapidly during the travelling of a vehicle, cracks and the like occur at the bonding layer.

Due to a recent demand for downsizing of a DPF of a large-sized vehicle, such as large truck, such a vehicle often comes with the DPF made of SiC and not cordierite, and so a large-sized DPF made of SiC is often used. A large-sized DPF loaded with catalyst tends to have a larger difference in temperature between the interior and the exterior of the DPF, and so more cracks occur in the DPF.

When the DPF made of SiC is a monolithic DPF with SCR, the loading amount of the catalyst increases, and so a material of the DPF having high porosity and lower thermal conductivity is often used. "SCR" stands for Selective Catalytic Reduction (selective reduction type NOx catalyst). Since a material having high porosity has a low heat-conducting property, a DPF made of such a material and loaded with catalyst has a drawback easily having a difference in temperature between the interior and the exterior of the DPF, and so cracks easily occur in the DPF.

In view of such problems of the conventional techniques, the present invention provides a segmented-structured plugged honeycomb structure capable of effectively suppressing the generation of cracks at the surface of the circumferential wall along the bonding layer.

The present invention provides the following plugged honeycomb structure.

According to a first aspect of the present invention, a plugged honeycomb structure is provided, including: a plurality of prismatic columnar shaped honeycomb segments; a bonding layer configured to mutually bond lateral faces of the plurality of honeycomb segments; and a circumferential wall disposed to surround circumference of a honeycomb segment bonded body where the plurality of honeycomb segments are bonded, wherein each of the honeycomb segments includes porous partition walls disposed so as to surround a plurality of cells, the plurality of cells extending from an inflow end face to an outflow end face, the cells of each honeycomb segment are plugged at ends of any one of the inflow end face side and the outflow end face side with plugging portions, and in the bonding layer, the bonding layer at a part that bonds the honeycomb segments disposed in contact with the circumferential wall is a circumferential bonding layer, and the bonding layer at a part that bonds the honeycomb segment including a center of gravity in a cross section orthogonal to the extending direction of the cells of the honeycomb segment bonded body or at a position closest to the center of gravity and another honeycomb segment adjacent to the honeycomb segment is a center bonding layer, and a bonding strength A1 of the circumferential bonding layer is larger than a bonding strength A2 of the center bonding layer.

According to a second aspect of the present invention, the plugged honeycomb structure according to the first aspect is provided, wherein the bonding strength A1 of the circumferential bonding layer is 1.2 to 1.6 times the bonding strength A2 of the center bonding layer.

According to a third aspect of the present invention, the plugged honeycomb structure according to the first or second aspect is provided, wherein the bonding strength A1 of the circumferential bonding layer is 850 to 1200 kPa.

A plugged honeycomb structure of the present invention can effectively suppress the generation of cracks at the surface of the circumferential wall along the bonding layer. That is, the plugged honeycomb structure of the present invention is configured so that only the bonding strength of the bonding layer at a part that bonds the honeycomb segments disposed in contact with the circumferential wall is large. This configuration does not degrade the degree of cracks occurring at the end face of the honeycomb segments and of cracks at the surface of the circumferential wall (e.g., cracks extending in the circumferential direction), and can effectively suppress the generation of cracks at the surface of the circumferential wall along the bonding layer. Cracks extending in the circumferential direction at the surface of the circumferential wall may be called "ring-off cracks". In this way, the plugged honeycomb structure of the present invention can effectively suppress the generation of cracks at the bonding layer and at the surface of the circumferential wall along the bonding layer without degrading the degree of the generation of cracks at other parts.

DESCRIPTION OF THE PREFERRED EMBODIMENTS

The following describes embodiments of the present invention, and the present invention is not limited to the following embodiments. The present invention is to be understood to include the following embodiments, to which modifications and improvements are added as needed based on the ordinary knowledge of a person skilled in the art without departing from the scope of the present invention.

(1) Plugged Honeycomb Structure:

As shown in FIGS. 1 to 4, a first embodiment of a plugged honeycomb structure of the present invention is a plugged honeycomb structure 100 including a plurality of honeycomb segments 4, a bonding layer 6 and plugging portions 5. The plugged honeycomb structure 100 of the present embodiment is a so-called segmented-structured plugged honeycomb structure. Circumference of the plugged honeycomb structure 100 further includes a circumferential wall 21 that surrounds the plurality of honeycomb segments 4.

The plugged honeycomb structure 100 of the present embodiment can be favorably used as a trapping filter to remove particulate matters included in exhaust gas.

Figure 1:
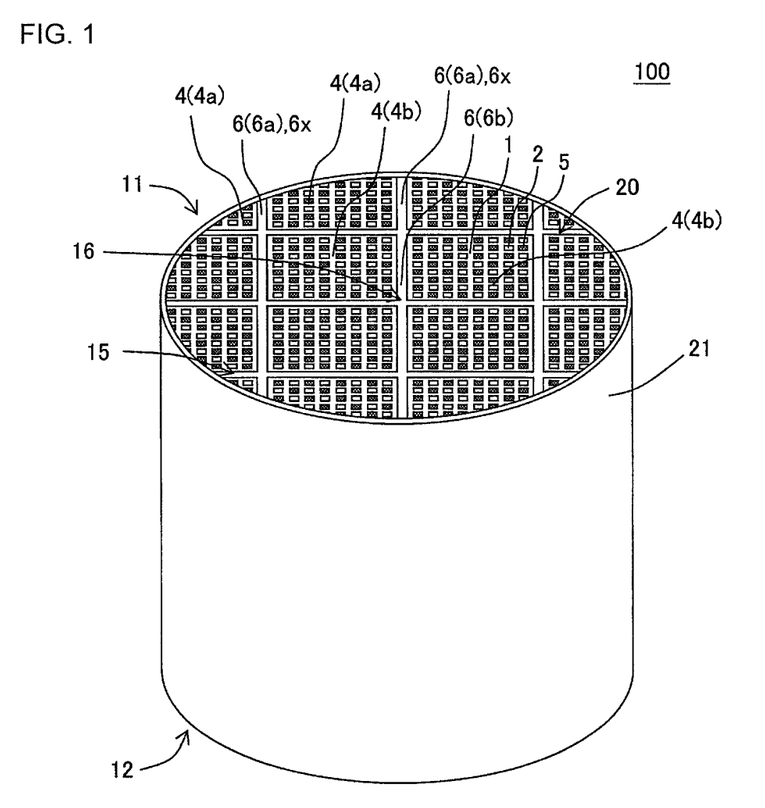
FIG. 1 is a perspective view schematically showing a first embodiment of a plugged honeycomb structure of the present invention seen from the inflow end face side.
Figure 2:
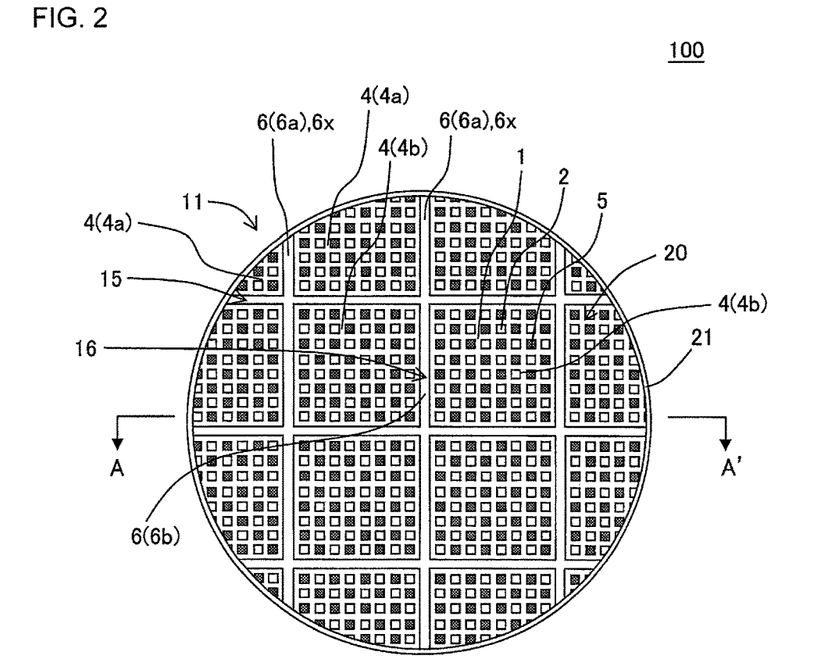
FIG. 2 is a plan view schematically showing the first embodiment of a plugged honeycomb structure of the present invention seen from the inflow end face side.
Figure 3:
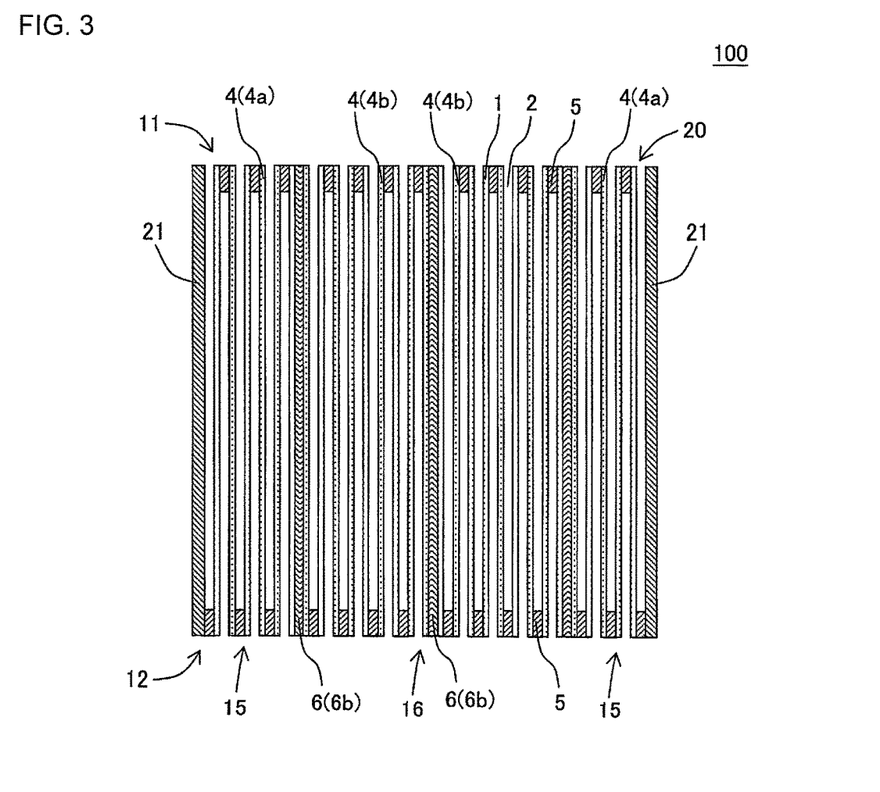
FIG. 3 is a schematic cross-sectional view taken along the line A-A' of FIG. 2.
Figure 4:
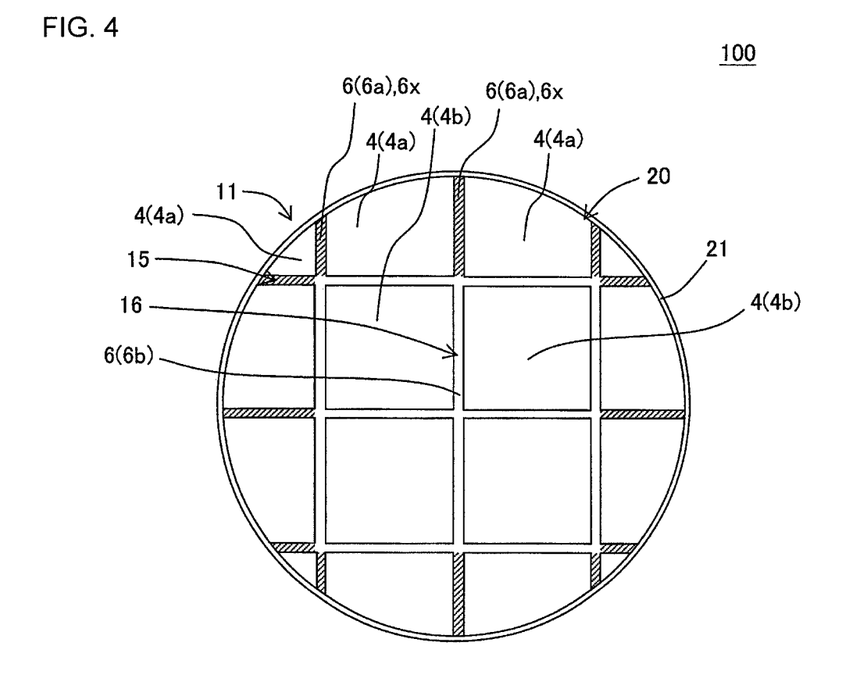
FIG. 4 schematically shows the structure of a bonding layer of the honeycomb structure shown in FIG. 2.

FIG. 1 is a perspective view schematically showing a first embodiment of the plugged honeycomb structure of the present invention seen from the inflow end face side. FIG. 2 is a plan view schematically showing the first embodiment of a plugged honeycomb structure of the present invention seen from the inflow end face side. FIG. 3 is a schematic cross-sectional view taken along the line A-A' of FIG. 2. FIG. 4 schematically shows the structure of a bonding layer of the honeycomb structure shown in FIG. 2.

Each of the honeycomb segments 4 includes porous partition walls 1 that surround a plurality of cells 2 extending from the inflow end face 11 to the outflow end face 12. Each honeycomb segment 4 further includes a segment circumferential wall at the circumferential part of the partition walls 1, so that the overall shape of the honeycomb segment is, for example, prismatic columnar. In the present invention, cells 2 refer to a space surrounded with the partition walls 1.

The plugged honeycomb structure 100 includes these plurality of honeycomb segments 4, and these plurality of honeycomb segments 4 are bonded at their lateral faces via the bonding layer 6. Among these plurality of honeycomb segments 4, the honeycomb segment 4 at the center part of the plugged honeycomb structure 100 has a "prismatic columnar" shape having the axial direction from the inflow end face 11 to the outflow end face 12. Among these plurality of honeycomb segments 4, the honeycomb segments 4 at the circumferential part in contact with the circumferential wall 21 have a pillar-shape having a part of the prismatic columnar honeycomb segment 4 grounded along the shape of the circumferential wall 21.

The bonding layer 6 includes a bonding material to bond the lateral faces of the plurality of honeycomb segments 4. Hereinafter a bonded body including a plurality of honeycomb segments 4 bonded via the bonding layer 6 may be called a "honeycomb segment bonded body 20".

The cells 2 of each honeycomb segment 4 are plugged at the ends of any one of the inflow end face 11 side and the outflow end face 12 side with the plugging portions 5. That is, the plugging portions 5 are disposed at the open ends of predetermined cells 2 at the inflow end face 11 of each honeycomb segment 4 and at the open ends of the residual cells 2 other than the predetermined cells 2 at the outflow end face 12.

In the following description, the cells 2 having the plugging portions 5 at the open ends of the inflow end face 11 of the honeycomb segment 4 (i.e., the predetermined cells 2) may be called "outflow cells". The cells 2 having the plugging portions 5 at the open ends of the outflow end face 12 of the honeycomb segment 4 (i.e., the residual cells 2) may be called "inflow cells". A honeycomb segment 4 having the plugging portions 5 disposed at the open ends of the cells 2 may be called a "plugged honeycomb segment".

Particularly the plugged honeycomb structure 100 of the present embodiment has a major feature about the bonding strength of the bonding layer 6 to bond the honeycomb segments 4. A honeycomb segment 4 making up a honeycomb segment bonded body 20 that is disposed in contact with the circumferential wall 21 is called a "circumferential honeycomb segment 4a". A part of the bonding layer 6 that bonds the circumferential honeycomb segments 4a is called a "circumferential bonding layer 6a". The bonding strength of the circumferential bonding layer 6a that bonds the circumferential honeycomb segments 4a is called "bonding strength A1". The honeycomb segment 4 at the position including the center of gravity or closest to the center of gravity in the cross section orthogonal to the extending direction of the cells 2 of the honeycomb segment bonded body 20 is called a "center honeycomb segment 4b". Then a part of the bonding layer 6 that bonds the center honeycomb segment 4b and another honeycomb segment 4 adjacent to the center honeycomb segment 4b is called a "center bonding layer 6b". The bonding strength of the center bonding layer 6b is called "bonding strength A2". When the center honeycomb segment 4b is a "honeycomb segment 4 including the center of gravity of the cross section", this refers to the case where the center of gravity is located in this "center honeycomb segment 4b". When the center honeycomb segment 4b is a "honeycomb segment 4 at the position closest to the center of gravity of the cross section", this refers to, for example, the case where the center of gravity is located at the bonding layer 6, the center honeycomb segment is the closest to the center of gravity.

The plugged honeycomb structure 100 of the present embodiment has a feature that the bonding strength A1 of the circumferential bonding layer 6a is larger than the bonding strength A2 of the center bonding layer 6b. This configuration of the plugged honeycomb structure 100 has the following advantageous effects. That is, this does not degrade the degree of the generation of cracks occurring at the end face of the honeycomb segments 4 and of cracks extending in the circumferential direction at the surface of the circumferential wall 21, and can effectively suppress the generation of cracks at the surface of the circumferential wall 21 along the bonding layer 6 (specifically the circumferential bonding layer 6a).

When the bonding strength A1 of the circumferential bonding layer 6a and the bonding strength A2 of the center bonding layer 6b are the same, and if both of the bonding strength A1 and the bonding strength A2 are small values, cracks easily occur at the bonding layer 6 at the circumferential part of the honeycomb segment bonded body 20. On the other hand, if both of the bonding strength A1 and the bonding strength A2 are large values, when large thermal stress is applied to the DPF due to the heat to burn PMs during the regeneration processing, the stress cannot be reduced at the bonding layer 6 sufficiently, and so cracks at the end face of the honeycomb segment 4 cannot be suppressed well. If the bonding strength A1 of the circumferential bonding layer 6a is smaller than the bonding strength A2 of the center bonding layer 6b, this also makes cracks easily occur at the bonding layer 6 at the circumferential part of the honeycomb segment bonded body 20.

In the present invention, the "bonding strength A1 of the circumferential bonding layer 6a" and the "bonding strength A2 of the center bonding layer 6b" are values measured by the following method. Firstly, the "bonding strength A1" is measured as follows. Two of the circumferential honeycomb segments 4a including the "circumferential bonding layer 6a" as a measurement target are cut out from the honeycomb segment bonded body 20 so as to prepare a measurement sample to measure the bonding strength A1. This measurement sample includes the two circumferential honeycomb segments 4a bonded with the circumferential bonding layer 6a. Then load is applied to this measurement sample at the end face of the circumferential honeycomb segments 4a using an instrument to measure shearing load. The load is applied at the loading rate of 2 mm/min., and the breaking load F1 is measured when the circumferential bonding layer 6a breaks. The area S1 of the bonding face of the circumferential bonding layer 6a that bonds the two circumferential honeycomb segments 4a is measured, and the "bonding strength A1" is calculated based on the following Expression (1). When the breaking load F1 is measured using the instrument to measure shearing load, one of the two circumferential honeycomb segments 4a is supported only at the lower end face and the other circumferential honeycomb segment 4a is not supported at the lower end face. In this state, load is applied to the measurement sample.

Bonding strength $A1$=breaking load $F1$/area $S1$ of the bonding face. Expression (1):

Next the "bonding strength A2" is measured as follows. The center honeycomb segment 4b is found in the honeycomb segment bonded body 20, which is at the position including the center of gravity or closest to the center of gravity in the cross section orthogonal to the extending direction of the cells 2. Then, the center honeycomb segment 4b and another honeycomb segment 4 including the "center bonding layer 6b" as a measurement target are cut out from the honeycomb segment bonded body so as to prepare a measurement sample to measure the bonding strength A2. This measurement sample includes the center honeycomb segment 4b and the other honeycomb segment 4 that are bonded with the center bonding layer 6b. For this measurement sample, the breaking load F2 is measured when the center bonding layer 6b breaks using the instrument to measure shearing load by a method similar to the bonding strength A1. The area S2 of the bonding face of the center bonding layer 6b is measured, and the "bonding strength A2" is calculated based on the following Expression (2).

Bonding strength $A2$=breaking load $F2$/area $S2$ of the bonding face. Expression (2):

Preferably the bonding strength A1 is 1.2 to 1.6 times the bonding strength A2, and more preferably 1.2 to 1.5 times. This can effectively suppress the generation of cracks at the surface of the circumferential wall 21 along the circumferential bonding layer 6a.

Preferably the bonding strength A1 of the circumferential bonding layer 6a is 850 to 1200 kPa, more preferably 900 to 1150 kPa and particularly preferably 900 to 1100 kPa. If the bonding strength A1 is less than 850 kPa, this is not favorable from the viewpoint of effectively suppressing the generation of cracks at the bonding layer 6. If the bonding strength A1 exceeds 1200 kPa, this is not favorable from the viewpoint of suppressing cracks at the end face of the honeycomb segments 4. Note here that the bonding strength A1 in the above numerical range is larger than the bonding strength A2.

Preferably the bonding strength A2 of the center bonding layer 6b is 400 to 900 kPa, more preferably 600 to 850 kPa and particularly preferably 700 to 800 kPa. If the bonding strength A2 is less than 400 kPa, this is not favorable from the viewpoint of keeping the bonding with the center bonding layer 6b. If the bonding strength A2 exceeds 900 kPa, this is not favorable from the viewpoint of suppressing cracks at the end face of the honeycomb segments 4 and ring-off cracks. Note here that the bonding strength A2 in the above numerical range is smaller than the bonding strength A1.

Preferably the bonding strength A1 of the circumferential bonding layer 6a is 1.2 to 1.6 times the bonding strength A2 of the center bonding layer 6b, more preferably 1.2 to 1.5 times and particularly preferably 1.3 to 1.4 times. If the bonding strength A1 is less than 1.2 times the bonding strength A2, this is not favorable from the viewpoint of suppressing cracks at the surface of the circumferential wall 21 along the circumferential bonding layer 6a. If the bonding strength A1 exceeds 1.6 times the bonding strength A2, this is not favorable from the viewpoint of suppressing cracks at the end face of the honeycomb segments 4.

In the plugged honeycomb structure 100 of the present embodiment, the circumferential bonding layer 6a and the center bonding layer 6b may be made of different materials. Alternatively the circumferential bonding layer 6a and the center bonding layer 6b may have mutually different bonding strength because they are different in porosity and the like. Such a configuration can make the difference between the bonding strength A1 and the bonding strength A2 clear, and so the advantageous effects as stated above can be effectively achieved.

The material of the bonding layer 6 is not limited especially, and the material of the bonding layer used in a conventionally known honeycomb structure may be used.

In the plugged honeycomb structure 100 of the present embodiment, the bonding strength A1 of the circumferential bonding layer 6a that bonds circumferential honeycomb segments 4a at the outermost circumference of the honeycomb segment bonded body 20 may be larger than the bonding strength of the bonding layer 6 at other parts. That is, only the bonding strength A1 of the circumferential 6a may be larger than the bonding strength of the bonding layer 6 at other parts. Note here that the bonding strength at a part other than the circumferential bonding layer 6a and the center bonding layer 6b is not limited especially as long as the bonding strength A1 is larger than the bonding strength A2. For instance, the bonding layer at a part that bonds honeycomb segments 4 located one or two or more inside of the circumferential honeycomb segment 4a (excluding the center bonding layer 6b) may have the bonding strength equal to the bonding strength A1 of the circumferential bonding layer 6a. The bonding layer at a part that bonds honeycomb segments 4 located one or two or more inside of the circumferential honeycomb segment 4a may have the bonding strength equal to the bonding strength A2 of the center bonding layer 6b. For instance, the embodiment may have various forms, such that only the "circumferential bonding layer 6a that bonds the circumferential honeycomb segments 4a at the outermost circumference" has a particularly high bonding strength.

As described above, the plugged honeycomb structure 100 of the present embodiment includes a circumferential part 15 including the circumferential bonding layer 6a and having relatively large bonding strength and a center part 16 including the center bonding layer 6b and having relatively small bonding strength in a cross section orthogonal to the extending direction of the cells 2. Hereinafter the bonding layer 6 at a part at the circumferential part 15 and having relatively large bonding strength may be called a "high-bonding strength bonding layer 6x". Preferably the ratio of the area of the high-bonding strength bonding layer 6x to the overall area of the bonding layer 6 in a cross section orthogonal to the extending direction of the cells 2 is 5 to 55%, more preferably 10 to 50% and particularly preferably 10 to 40%. If the ratio of the area of the high-bonding strength bonding layer 6x exceeds this numerical range, it may be difficult to keep the balance between suppressing the generation of cracks at the high-bonding strength bonding layer 6x and suppressing the generation of cracks at the end face of the honeycomb segments 4 or at surface of the circumferential wall 21.

The "width of the bonding layer 6 in the direction orthogonal to the extending direction of the cells 2" is not limited especially. The "width of the bonding layer 6 in the direction orthogonal to the extending direction of the cells 2" refers to the distance between the mutual lateral faces of the honeycomb segments that are bonded with the bonding layer. Hereinafter the "width of the bonding layer 6 in the direction orthogonal to the extending direction of the cells 2" may be simply called a "width of the bonding layer 6". For instance, the width of the bonding layer 6 is 0.3 to 3.0 mm preferably, and 0.5 to 2.0 mm particularly preferably. If the width of the bonding layer 6 is less than 0.3 mm, this is not favorable because the bonding strength of the plugged honeycomb structure 100 easily deteriorates. If the width of the bonding layer 6 exceeds 3.0 mm, this is not favorable because the pressure loss of the plugged honeycomb structure 100 may increase.

The shape of the cells 2 in the honeycomb structure body 4 is not limited especially. For instance, the cells 2 may have a polygonal shape, a circular shape, an elliptic shape and the like in a cross section orthogonal to the extending direction of the cells 2. Examples of the polygonal shape include a triangle, a quadrangle, a pentagon, a hexagon, and an octagon. Preferably the shape of the cells 2 is a triangle, a quadrangle, a pentagon, a hexagon, or an octagon. For the shape of the cells 2, all of the cells 2 may have the same shape, or the cells 2 may have different shapes. For instance, although not shown, quadrangular cells and octagonal cells may be combined. For the size of the cells 2, all of the cells 2 may have the same size, or the cells 2 may have different sizes. For instance, although not shown, some of the plurality of cells may be larger, and other cells may be smaller relatively.

Preferably the cells 2 defined by the partition walls 1 have cell density that is 15 to 90 cells/cm$^2$, and 30 to 60 cells/cm$^2$ more preferably. The thus configured plugged honeycomb structure of the present embodiment can be preferably used as a filter to purify exhaust gas emitted from an automobile engine.

The partition walls 1 preferably have porosity of 30 to 80%, more preferably 35 to 75%, and particularly preferably 40 to 70%. The porosity of the partition walls 1 is a value measured by mercury porosimetry. The porosity of the partition walls 1 can be measured, for example, using Autopore 9500 (product name) produced by Micromeritics Co. To measure the porosity, a part of the partition wall 1 of each honeycomb segment 4 may be cut out to prepare a test piece for the measurement. If the porosity of the partition walls 1 is less than 30%, the pressure loss of the plugged honeycomb structure 100 may increase or the pressure loss after loading with catalyst may vary largely. If the porosity of the partition walls 1 exceeds 80%, the strength and the trapping performance of the plugged honeycomb structure 100 as a filter may deteriorate.

The shape of the honeycomb segment 4 is not limited especially. For instance, the honeycomb segment 4 may have a prismatic columnar shape having a polygonal, such as quadrangular or hexagonal, shaped cross section that is orthogonal to the axial direction of the honeycomb segment 4. Honeycomb segments 4 disposed at the outermost circumference of the plugged honeycomb structure 100 may have a prismatic columnar shape, a part of which is processed by grinding or the like in accordance with the overall shape of the plugged honeycomb structure 100.

The overall shape of the plugged honeycomb structure 100 is not limited especially. For instance, the overall shape of the plugged honeycomb structure 100 in FIG. 1 has a round pillar shape 1 having circular inflow end face 11 and outflow end face 12. Although not illustrated, the overall shape of the plugged honeycomb structure may be a pillar shape having the inflow end face and the outflow end face that are substantially circular in shape, including an ellipse, a racetrack shape, or an oval. Alternatively, the plugged honeycomb structure may have the overall shape that is a prismatic columnar shape having the inflow end face and the outflow end face that are a polygon, such as a quadrangle or a hexagon.

The material of the honeycomb segments 4 is not limited especially, which is preferably at least one type selected from the group consisting of the following materials from the viewpoint of the strength, heat resistance, durability and the like. The group of the materials includes silicon carbide, silicon-silicon carbide based composite material, silicon nitride, cordierite, mullite, alumina, spinel, silicon carbide-cordierite based composite material, lithium aluminum silicate, aluminum titanate and Fe—Cr—Al based metal. Among these materials, silicon carbide or silicon-silicon carbide based composite material is preferable. The silicon-silicon carbide composite material is a composite material including silicon carbide (SiC) as the aggregate and silicon (Si) as the binder.

The material of the plugging portions 5 is not limited especially. Preferably the plugging portions 5 are made of a material similar to the illustrated materials of the honeycomb segments 4, for example.

The size of the plugged honeycomb structure 100 including the length from the inflow end face 11 to the outflow end face 12 and the size of a cross section orthogonal to the extending direction of the cells 2 of the plugged honeycomb structure 100, is not limited especially. The size of the plugged honeycomb structure 100 of the present embodiment may be selected appropriately so that it can have the optimum ability for purification when it is used as a filter to purify exhaust gas. For instance, the length from the inflow end face 11 to the outflow end face 12 of the plugged honeycomb structure 100 is preferably 150 to 305 mm, and particularly preferably 150 to 200 mm. The area of a cross section orthogonal to the extending direction of the cells 2 of the plugged honeycomb structure 100 is preferably 144 to 330 $mm^2$, and particularly preferably 144 to 178 $mm^2$.

The plugged honeycomb structure 100 of the present embodiment includes the plugging portions 5 disposed at open ends of predetermined cells 2 at the inflow end face 11 side and at open ends of the residual cells at the outflow end face 12 side. The cells 2 having the plugging portions 5 at the open ends of the outflow end face 12 side and that are open at the inflow end face 11 side are inflow cells. The cells 2 having the plugging portions 5 at the open ends of the inflow end face 11 side and that are open at the outflow end face 12 side are outflow cells. Preferably the inflow cells and the outflow cells are arranged alternately via the partition walls 1. Thereby, a checkerboard pattern is preferably formed with the "plugging portions 5" and the "open ends of the cells 2" at each of the end faces of the plugged honeycomb structure 100.

In the plugged honeycomb structure 100 of the present embodiment, the partition walls 1 defining the plurality of cells 2 may be loaded with catalyst. The partition walls 1 being loaded with catalyst refers to coating of the catalyst at the surface of the partition walls 1 or at the inner walls of the pores formed in the partition walls. The thus configured plugged honeycomb structure can convert CO, NOx, HC or the like in the exhaust gas into harmless substances through the catalytic reaction. This also can promote the oxidization of the trapped PMs, such as soot.

(2) Method for Manufacturing Plugged Honeycomb Structure:

There is no particular limitation on the method for manufacturing the plugged honeycomb structure of the present embodiment, and this can be manufactured by the following method, for example. Firstly a plastic kneaded material is prepared to produce a honeycomb segment. The kneaded material to produce the honeycomb segment can be prepared by adding additives, such as binder, and water as needed to a material selected as raw material powder from the aforementioned materials suitable for the honeycomb segments.

Next, the thus prepared kneaded material is extruded, thus producing a prismatic columnar honeycomb formed body having partition walls surrounding a plurality of cells and a segment circumferential wall disposed at the outermost circumference. A plurality of such honeycomb formed bodies is prepared.

The thus obtained each of the honeycomb formed bodies is dried by microwaves and hot air, for example, and then open ends of the cells are plugged with a material similar to the material used for the honeycomb formed body, thus producing plugging portions. After forming the plugging portions, the honeycomb formed body may be dried again.

Next the honeycomb formed body including the prepared plugging portions is fired, so as to obtain a plugged honeycomb structure. Firing temperatures and atmosphere vary with the raw material, and the person skilled in the art can select the firing temperature and the firing atmosphere that are the most suitable for the selected material.

Next, the plurality of plugged honeycomb segments are bonded mutually using a bonding material, followed by drying and curing, which is then processed at its circumference to have a desired shape, whereby a segmented structured plugged honeycomb structure can be obtained. The bonding material may be prepared by adding liquid medium such as water to a ceramics material to be in a paste form or in a slurry form. For this bonding material, two types of the bonding material are preferably prepared as follows. For example, two types of the bonding material having different ratios of the liquid medium are prepared by adjusting the amount of liquid medium such as water to be added to the bonding material. Alternatively two types of the bonding material having different amounts of pore former may be prepared by adding the pore former of different amounts to the bonding material. A bonding material with less liquid medium makes the resultant bonding layer have large bonding strength. A bonding material with less pore former makes the resultant bonding layer have large bonding strength.

These manufactured two types of bonding layers are correctly used for the part to bond the plugged honeycomb segments disposed at the outermost circumference and the other part, whereby the resultant plugged honeycomb structure can have different bonding strength of the bonding layer between the circumferential part and the center part.

Since the cells are exposed in the processed face after the processing of the bonded body of the plugged honeycomb segments at the circumference, a circumference coating material may be applied to the processed face of the bonded body to form the circumferential wall. The circumference coating material may be prepared, for example, by adding an additive such as organic binder, foamable resin or dispersing agent to inorganic raw materials such as inorganic fiber, colloidal silica, clay or SiC particles and adding water, followed by kneading to be in a slurry form.

EXAMPLES

The following describes the present invention more specifically by way of examples, and the present invention is by no means limited to these examples.

Example 1

As the ceramics raw material, silicon carbide (SiC) powder and metal silicon (Si) powder were mixed at the mass ratio of 80:20 to prepare a mixed raw material. Hydroxypropylmethyl cellulose as binder and water absorbable resin as pore former were added to this mixed raw material, to which water was added, thus manufacturing a forming raw material. The obtained forming raw material was kneaded by a kneader, thus preparing a kneaded material.

Next, the obtained kneaded material was formed using a vacuum extruder to produce twenty-five honeycomb formed bodies each having a quadrangular-prism shape. Each of these honeycomb formed bodies having a quadrangular-prism shape was a honeycomb segment.

Next, the obtained honeycomb formed bodies were heated and dried by high-frequency induction heating, followed by drying at 120° C. for 2 hours by a hot-air drier.

Next, plugging portions were formed at each of the dried honeycomb formed bodies. Firstly a mask was applied to the inflow end face of the dried honeycomb formed body. Next the masked end part (the end part on the inflow end face side) was immersed in slurry for plugging to fill the open ends of the cells without the mask (outflow cells) with the slurry for plugging. In this way, plugging portions were formed at the inflow end face side of the dried honeycomb formed body. Then, plugging portions were formed at the inflow cells as well similarly to the outflow end face of the dried honeycomb formed body.

Then each honeycomb formed body having the plugging portions formed was degreased and fired. In this way, plugged honeycomb segments were obtained. Degreasing was performed at 550° C. for 3 hours, and firing was performed at 1,450° C. for 2 hours in an argon atmosphere.

In this way, the plugged honeycomb segments to manufacture the plugged honeycomb structure of Example 1 were manufactured. In the produced plugged honeycomb segment, a cross section orthogonal to the axial direction was square in shape, and the length of one side of the square (segment size) was 36.5 mm. Table 1 shows the result in the field of "length of one side (mm)" of the "honeycomb segment". The honeycomb segment had the length in the axial direction of 178 mm.

The plugged honeycomb segment had the thickness of the partition wall of 0.3 mm and the cell density of 46 cells/cm$^2$. The partition walls had the porosity of 41%. The porosity of the partition walls was measured using Autopore 9500 (product name) produced by Micromeritics Co.

Next two types of the bonding material to bond the plugged honeycomb segments were prepared. The material to form the bonding layer of the plugged honeycomb structure is the bonding material. Hereinafter the two types of the bonding material are called "bonding material A" and "bonding material B". The bonding material A was prepared so that its bonding strength was 900 kPa. The bonding material B was prepared so that its bonding strength was 700 kPa.

Next, the obtained plugged honeycomb segments were adjacently disposed so that their lateral faces were opposed mutually, and were bonded with the bonding material, followed by heat treatment at 700° C. so as to manufacture a honeycomb segment bonded body. The honeycomb segment bonded body was manufactured by bonding the twenty-five honeycomb segments in total so that the honeycomb segments were disposed at their end faces five in rows and five in columns. The "number of segments" and the "arrangement (rows×columns)" in the "honeycomb segments" in Table 1 show the number of honeycomb segments and the arrangement in Examples. For instance, "5×5" in the field of "arrangement (rows×columns)" means that twenty-five honeycomb segments in total including five in rows and five in columns were used.

In Example 1, the above-described "bonding material A" was used to bond twelve plugged honeycomb segments located at the outermost circumference of the honeycomb segment bonded body. The above-described "bonding material B" was used for the other bonding part. The thickness of the bonding layer formed with the bonding material was 1.0 mm. The part including the bonding material A was the circumferential part of the honeycomb segment bonded body. The part including the bonding material B was the center part of the honeycomb segment bonded body.

Next, the honeycomb segment bonded body was grounded at the circumference to have a round pillar shape, and a coating material was applied to the circumferential face, whereby the plugged honeycomb structure of Example 1 was obtained. The plugged honeycomb structure of Example 1 had the diameter at the end face of 191 mm.

For this plugged honeycomb structure of Example 1, the bonding strength of the bonding layer at the circumferential part and the bonding strength of the bonding layer at the center part were measured by the following method. Table 2 shows the result in the fields of the "bonding strength at circumferential part (kPa)" and the "bonding strength at center part (kPa)". Table 2 shows the ratio of the bonding strength at circumferential part to the bonding strength at center part in the field of "bonding strength ratio (circumferential part/center part)". Table 2 shows the ratio of the bonding area of the high-bonding strength bonding layer to the total bonding area of the bonding layer in the field of "bonding area ratio (high-bonding strength area/total bonding area)". The high-bonding strength bonding layer refers to a bonding layer at the circumferential part and having relatively large bonding strength. The high-bonding strength area refers to the area of the bonding face that is bonded with the high-bonding strength bonding layer.

(Method for Measuring Bonding Strength)

Firstly two of the circumferential honeycomb segments including the circumferential bonding layer were cut out so as to prepare a measurement sample to measure the bonding strength at the circumferential part (i.e., bonding strength A1). Then load was applied to this measurement sample at the end face of the circumferential honeycomb segments using an instrument to measure shearing load. The load was applied at the loading rate of 2 mm/min., and the breaking load F1 was measured when the circumferential bonding layer broke. The area S1 of the bonding face of the circumferential bonding layer that bonded the two circumferential honeycomb segments was measured, and the "bonding strength at circumferential part (kPa)" as the bonding strength A1 was obtained based on Expression (1). Then, the center honeycomb segment and another honeycomb segment including the center bonding layer were cut out so as to prepare a measurement sample to measure the bonding strength at the center part (i.e., the bonding strength A2). For this measurement sample, the breaking load F2 was measured when the center bonding layer broke using the instrument to measure shearing load by a method similar to the above. The area S2 of the bonding face of the center bonding layer was measured, and the "bonding strength at center part (kPa)" as the bonding strength A2 was obtained based on Expression (2).

TABLE 1

|  | honeycomb bonded body | | honeycomb segment | | |
|---|---|---|---|---|---|
|  | diameter (mm) | length (mm) | length of one side (mm) | number of segments | arrangement (rows × columns) |
| Ex. 1 | 191 | 178 | 39 | 25 | 5 × 5 |
| Ex. 2 | 191 | 178 | 39 | 25 | 5 × 5 |
| Ex. 3 | 191 | 178 | 39 | 25 | 5 × 5 |
| Ex. 4 | 241 | 254 | 36.5 | 49 | 7 × 7 |
| Ex. 5 | 241 | 254 | 36.5 | 49 | 7 × 7 |
| Ex. 6 | 241 | 254 | 36.5 | 49 | 7 × 7 |
| Comp. Ex. 1 | 191 | 178 | 39 | 25 | 5 × 5 |
| Comp. Ex. 2 | 191 | 178 | 39 | 25 | 5 × 5 |
| Comp. Ex. 3 | 241 | 254 | 36.5 | 49 | 7 × 7 |

TABLE 2

|  | bonding layer | | | | |
|---|---|---|---|---|---|
|  | width of the bonding layer (mm) | bonding strength at circumferential part (kPa) | bonding strength at center part (kPa) | bonding strength ratio (circumferential part/center part) | bonding area ratio (high-bonding strength area/total bonding area) |
| Ex. 1 | 1.0 | 900 | 700 | 1.29 | 0.37 |
| Ex. 2 | 1.0 | 1000 | 700 | 1.43 | 0.37 |
| Ex. 3 | 1.0 | 1000 | 800 | 1.25 | 0.37 |
| Ex. 4 | 1.0 | 950 | 700 | 1.36 | 0.16 |
| Ex. 5 | 1.0 | 1000 | 700 | 1.43 | 0.16 |
| Ex. 6 | 1.0 | 1100 | 800 | 1.38 | 0.16 |
| Comp. Ex. 1 | 1.0 | 700 | 700 | — | — |
| Comp. Ex. 2 | 1.0 | 1000 | 1000 | — | — |
| Comp. Ex. 3 | 1.0 | 700 | 700 | — | — |

For the plugged honeycomb structure of Example 1, "rapid cooling test (electric furnace spalling test: E-sp evaluation)" and "crack limit evaluation" were performed by the following method. Table 3 shows the result.

(Rapid Cooling Test (Electric Furnace Spalling Test: E-Sp Evaluation))

A plugged honeycomb structure was placed in the electric furnace at 200° C. as the temperature inside of the furnace and was heated for 2 hours so that the plugged honeycomb structure had a uniform temperature. After that, the heated plugged honeycomb structure was taken out from the electric furnace, and was rapidly cooled to room temperatures. The plugged honeycomb structure after rapid cooling was checked about the generation of cracks at the circumferential wall. When no cracks were generated at the circumferential wall, the temperature in the furnace was increased by 25° C. at one time, and the heating and rapid cooling were repeated until cracks were generated at the circumferential wall. The temperature in the furnace during the previous operation before the cracks were generated at the circumferential wall was set as the measurement value in the rapid cooling test.

(Crack Limit Evaluation)

A plugged honeycomb structure was mounted on an exhaust system of a diesel engine so as to accumulate soot on this plugged honeycomb structure. Next, the temperature of exhaust gas was increased to 650° C. at the rate of 2° C./sec. After that, the condition was changed to the idling operation so as to rapidly decrease the flow rate of the gas. In such a condition, the soot accumulated in the plugged honeycomb structure was burned to regenerate the plugged honeycomb structure. While increasing the accumulation rate of the soot in the plugged honeycomb structure, such a test (regeneration of the plugged honeycomb structure) was repeated. The accumulation rate of soot refers to the rate of soot in mass (g) accumulated in the plugged honeycomb structure per unit volume (per liter) of the plugged honeycomb structure. Then, the maximum accumulation rate of soot that did not generate cracks at the plugged honeycomb structure was examined. Such an accumulation rate of soot was called "crack limit". When the crack limit was less than 6 g/L, this was evaluated as "B". When the crack limit was 6 g/L or more, this was evaluated as "A".

TABLE 3

|  | rapid cooling test (E-sp evaluation) | crack limit evaluation |
|---|---|---|
| Ex. 1 | 325 | A |
| Ex. 2 | 350 | A |
| Ex. 3 | 350 | A |
| Ex. 4 | 275 | A |
| Ex. 5 | 300 | A |
| Ex. 6 | 350 | A |
| Comp. Ex. 1 | 300 | A |
| Comp. Ex. 2 | 350 | B |
| Comp. Ex. 3 | 250 | A |

Examples 2, 3

Plugged honeycomb structures of these examples were manufactured similarly to Example 1 other than that the bonding materials prepared to have the bonding strength shown in Table 2 were used.

Examples 4 to 6

Plugged honeycomb structures of these examples were manufactured similarly to Example 1 other than that the structure of the honeycomb segments and the honeycomb bonded body were changed as shown in Table 1 and the bonding materials prepared to have the bonding strength shown in Table 2 were used.

Comparative Examples 1 to 3

Plugged honeycomb structures of these examples were manufactured similarly to Example 1 other than that one type of the bonding material was used to manufacture the honeycomb segment bonded body.

Also for these plugged honeycomb structures of Examples 2 to 6 and Comparative Examples 1 to 3, "rapid cooling test (electric furnace spalling test: E-sp evaluation)" was performed similarly to Example 1. Table 3 shows the result.

(Results)

The plugged honeycomb structures of Examples 1 to 3 had favorable results in the rapid cooling test as compared with the plugged honeycomb structure of Comparative Example 1. The plugged honeycomb structures of Comparative Example 2 had large bonding strength of the bonding layer at both of the circumferential part and the center part, and so had a favorable result in the rapid cooling test. However, the crack limit in the crack limit evaluation was less than 6 g/L. The plugged honeycomb structures of Examples 4 to 6 had favorable results in the rapid cooling test as compared with the plugged honeycomb structure of Comparative Example 3.

The plugged honeycomb structure of the present invention can be used as a trapping filter to remove particulates included in exhaust gas emitted from a direct injection type gasoline engine, a diesel engine, or the like.

DESCRIPTION OF REFERENCE NUMERALS

1: partition wall, 2: cell, 4: honeycomb segment, 4a: circumferential honeycomb segment, 4b: center honeycomb segment, 5: plugging portion, 6: bonding layer, 6a: circumferential bonding layer, 6b: center bonding layer, 6x: high-bonding strength bonding layer, 11: inflow end face, 12: outflow end face, 15: circumferential part, 16: center part, 20 honeycomb segment bonded body, 21: circumferential wall, 100: plugged honeycomb structure

What is claimed is:

1. A plugged honeycomb structure, comprising: a plurality of prismatic columnar shaped honeycomb segments;
    a bonding layer that mutually bonds adjacent lateral faces of the plurality of honeycomb segments; and
    a circumferential wall disposed to surround a circumference of a honeycomb segment bonded body where the plurality of honeycomb segments are bonded,
    wherein each of the honeycomb segments includes porous partition walls disposed so as to surround a plurality of cells, the plurality of cells extending from an inflow end face to an outflow end face,
    the plurality of cells of each honeycomb segment of the plurality of honeycomb segments are plugged at ends of any one of the inflow end face and the outflow end face with plugging portions,
    in the bonding layer, the bonding layer at a part that bonds the honeycomb segments disposed in contact with the circumferential wall is a circumferential bonding layer, and the bonding layer at a part that bonds the honeycomb segments including a center of gravity in a cross section orthogonal to the extending direction of the plurality of cells of the honeycomb segment bonded body or at a position closest to the center of gravity and another adjacent honeycomb segment is a center bonding layer, and a bonding strength A1 of the circumferential bonding layer is larger than a bonding strength A2 of the center bonding layer, and
    wherein the bonding strength A1 of the circumferential bonding layer is 1.25 to 1.43 times the bonding strength A2 of the center bonding layer.

2. The plugged honeycomb structure according to claim 1, wherein the bonding strength A1 of the circumferential bonding layer is 850 to 1200 kPa.

* * * * *